United States Patent Office 3,553,051
Patented Jan. 5, 1971

3,553,051
SELF-SUPPORTING ADHESIVE TAPE COMPRISING SYNTHETIC TRANS-1,4 POLYISOPRENE AND METHOD OF USING SAID TAPE
Wolfgang Warrach, Frederick Bernard Swinney, and Eric George Kent, Sarnia, Ontario, Canada, assignors to Polymer Corporation Limited, Sarnia, Ontario, Canada, a body corporate and body politic
No Drawing. Filed Oct. 21, 1965, Ser. No. 500,159
Claims priority, application Canada, Mar. 9, 1965, 925,114
Int. Cl. B32b 27/30; C09j 7/02
U.S. Cl. 156—309                      4 Claims

ABSTRACT OF THE DISCLOSURE

A method of bonding materials such as fabrics, leather, wood and paper by a thermoplastic adhesive composition based on crystalline trans-1,4 polymer of a conjugated diolefine, for example, trans-1,4 polyisoprene, and optionally containing compatible resin and/or filler. This composition may be used in the form of a self-supporting adhesive tape and is adhesively activated by heat or solvent before or after contacting said materials.

---

This invention relates to adhesives compositions and products containing said compositions. In particular it relates to adhesive compositions based on crystalline trans-1,4 polymers of conjugated diolefins.

In the formulation of adhesive compositions, it is desired to use materials which have a good cohesion as well as good adhesion to a variety of surfaces such as cardboard, wood, fabrics, plastics, rubbers, metals or glass. In specific applications, adhesives are required to be plastic and easily applicable to the surfaces and yet they must be firm in use to resist cold flow and to hold bonded materials in place. In other applications, they must be flexible at low temperatures, develop good-strength at elevated temperatures, be water-proof, and/or resistant to ageing. It has not been hitherto possible to produce an adhesive composition which would meet all of the above requirements. Rubbery hydrocarbon polymers do not provide a high bonding strength. Resinous hydrocarbon polymers, on the other hand, are stiff and brittle at room temperature to permit their use in applications where flexibility is important, or have limited compatibility with substances used in adhesive compositions and poor affinity for hydrophilic surfaces.

It is the object of this invention to provide an adhesive composition based on a crystalline hydrocarbon polymer. A further object is to provide a thermoplastic adhesive compositions based on trans-1,4 polymer of conjugated diolefine. Yet another object is to provide composite products containing as the essential component an adhesive composition based on trans-1,4 polymer of conjugated diolefinic hydrocarbon.

We have now found that crystalline polymer of open chain conjugated diolefinic hydrocarbons and in particular crystalline trans-1,4 polymers of isoprene having a molecular weight of about 50,000 to 350,000, are suitable for the production of adhesive compositions which are easily applied and which develop high bonding strength. The objects of this invention have been achieved in providing a non-aqueous adhesive composition comprising a crystalline synthetic polymer of an open chain conjugated diolefinic hydrocarbon, said polymer having a molecular weight of about 50,000 to 350,000. In one of the specific embodiments, the objects have been achieved in providing a flexible thermoplastic adhesive composition comprising a mixture of a crystalline trans-1,4 polyisoprene having a molecular weight of about 50,000 to 350,000 and a compatible resin in an amount between 0 and 100 parts per 100 parts of the polymer.

The synthetic polymers which can be used in the adhesive compositions in accordance with this invention are crystalline polymers of open chain conjugated diolefinic hydrocarbons containing 4–12 carbon atoms and at least one vinyl group. The diolefinic hydrocarbons may be represented by the general formula:

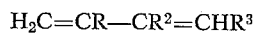

$$H_2C=CR—CR^2=CHR^3$$

where R, $R^2$ and $R^3$ are hydrogen or a hyrocarbyl radical containing 1 to 8 and preferably 1–2 carbon atoms. It is preferred to use a polymer of a diolefin containing 4 to 6 carbon atoms such as butadiene-1,3, isoprene, piperylene, 2,3-dimethyl butadiene-1,3 and 2-ethyl butadiene-1,3. Copolymers of these diolefins with each other or with minor amounts of $C_2-C_8$ monoolefins may also be used, although for best results a homopolymer is preferred. The polymer must be crystalline at room temperature, that is, produce a characteristic X-ray diffraction pattern with distinct spots, typical of periodic, well ordered structures such as found in crystals. The amount of crystallinity is determined by measuring areas under the crystalline peaks and amorphous peaks in the X-ray diffraction curve and is expressed as percent of the crystalline area to the sum of crystalline and amorphous areas. The reproducibility of this method of determining crystallinity is about ±2% provided the samples are uniformly pretreated, that is, heated in a press at a temperature about 10° C. above the melting point and then cooled at a temperature about 70° C. below the melting point. The polymers of conjugated diolefins should be at least 5% and preferably, at least 10% crystalline. The upper limit of crystallinity is not critical, although it is not practical to use polymer higher than 60% crystalline. For best results, a crystallinity of about 20 to 40% is preferred. The optimum crystallinity level varies somewhat depending on the type of crystals and their melting point. The crystallinity of polymers is indicative of a periodic order along the polymeric chains which is usually due to the presence of sequences of monomer units all linked in the same steric configuration. On the average, polymers of conjugated diolefins should have at least 85% of the monomeric units in a configuration favouring crystal formation. Copolymers of diolefins must also have a high stereoregularity and at least 90% of all the diolefinic units should be in a configuration favouring crystallization. Polybutadiene may exist in four stereoregular isomeric forms. Of these, three are crystalline at room temperature: trans-1,4 polybutadiene, isotactic 1,2 polybutadiene and syndiotactic 1,2 polybutadiene. The trans-1,4 polybutadiene is preferred, but other crystalline polymers may also be used. Of the crystalline polymers of conjugated diolefins containing 5–6 carbon atoms, trans-1,4 polymers are preferred. Trans-1,4 polyisoprene and trans-1,4 polypiperylene are representative examples of such polymers and best results are obtained with trans-1,4 polyisoprene. The melting points of the crystalline polymers which are used in the adhesive compositions of this invention may vary within wide limits, although it is preferred to use polymers having a melting point below 150° C., and preferably in the range between about 50° C. and about 140° C. Trans-1,4 polyisoprene melts at about 65° C., trans-1,4 polybutadiene at about 141° C., while trans-1,4 copolymers of butadiene and isoprene at about 100–125° C.

The molecular weight of the polymer which can be used according to the invention must be controlled to a range between about 50,000 and 350,000. Polymers of lower molecular weight can be also used, although the adhesive compositions containing them do not develop the strength required in some applications. Similarly, polymers having a molecular weight about 350,000 are of limited utility because they are difficult to process to compositions having good adhesive strength. The preferred range of the molecular weight of the preferred trans-1,4 polymers is between about 85,000 and about 200,000. The molecular weight referred to is a viscosity average molecular weight which is calculated from the intrinsic viscosity according to the equation:

$$[\eta] = 4.37 \times 10^{-4} M^{0.65}$$

where $[\eta]$ is the intrinsic viscosity measured in toluene at 30° C. and M is the viscosity average molecular weight. The molecular weight of rubbery polymers is frequently expressed in terms of the Mooney viscosity which is measured according to ASTM procedure D–1646–61. The Mooney viscosity (ML–4 at 100° C.) of trans-1,4- polyisoprene, the preferred polymer of this invention, ranges from about 5 to about 30 and preferably from 10 to 20.

The crystalline polymers are prepared by polymerizing a conjugated diolefin in a hydrocarbon or halohydrocarbon diluent in the presence of stereospecific catalysts such as a mixture of $AlR_3$ and $VCl_3$ or $LiAlH_4$ and $TiI_4$ where R is preferably an alkyl radical. These catalysts, generally called the Ziegler type catalysts, are well known in the art. The production of crystalline polymers in the presence of these catalysts is not the subject of this invention. The product of the polymerization reaction may be used in the form of a cement as produced or in solid form after recovering and purifying. If the molecular weight is too high, it is necessary to reduce it to the desired level. This can be achieved by masticating the solid polymer in the presence of air, or by thermal degradation. The polymer so treated appears to have an advantage in adhesive applications over the unmasticated polymer of equal molecular weight.

One of the advantages of the crystalline diolefin polymer in compositions of this invention is that no additional macromolecular materials or crosslinking agents are required to produce adhesive compositions having high adhesive strength. For example, a trans-1,4 polyisoprene having a Mooney viscosity of about 15 can be easily shaped by calendering or pressure moulding into a sheet or tape. The sheeted material is dry, non-tacky and non-blocking, that is, does not adhere to itself, and can be stored at room temperature for a prolonged period of time. When needed as an adhesive, the sheet or tape can be heat activated at or above the temperature of melting and bonded to a variety of materials such as metals, hydrophilic materials, and synthetic or natural rubber. The crystalline polymer can also be used in the form of an adhesive cement. For that purpose, a polymer such as trans-1,4 polyisoprene having a Mooney viscosity of less than about 20 is dissolved in an organic solvent to form a solution of about 5 to 20 percent by weight. The organic solvent may be an aromatic hydrocarbon such as benzene or toluene, or a halogenated hydrocarbon such as methylene chloride, chlorobenzene or carbon tetrachloride. Other suitable solvents include methyl ethyl ketone and tetrahydrofuran. An aliphatic hydrocarbon such as hexane or heptane may be used in blends with the aforementioned solvents where a low viscosity cement is required. When it is desired to prepare a more viscous adhesive cement having a viscosity of at least 2000 centipoise at 25° C. such as used in pastes or mastics, an aromatic hydrocarbon such as toluene or a chlorinated hydrocarbon such as methylene chloride may be used.

The crystalline polymer of conjugated diolefin can also be used in blends with various other polymeric materials. For example, trans-1,4 polyisoprene can be blended in varying proportions with natural rubber, cis-1,4 polybutadiene or other synthetic rubber if high flexibility is desired at temperature at or below about 20° C. The adhesive compositions based on such blends are suitable for bonding hydrophobic substances such as rubber. When rigidity is required, the crystalline polymer may be blended with compatible resins. The compatible resins which can be used are those which are miscible in all proportions with the crystalline polymer. These include hydrocarbon resins such as polyethylene or polystyrene which may be used where a high polarity is not required. It is, however, preferred to use resins of a polar character since they impart an affinity for hydrophilic substances such as cellulose based fabrics, plywood, cardboard and leather. Such resins are preferably soluble in hydrocarbon solvents and melt or soften at temperatures of about 50 to 160° C. to a relatively fluid or plastic state. Representative examples of such resins are non-heat-reactive phenol-formaldehyde resins, coumarone-indene resins, terpene-phenolic resins and abietic acid-based resins such as natural or polymerized wood rosin, glycerol rosin ester. Heat reactive phenol-formaldehyde resin and other thermosetting resins such as resorcinol formaldehyde resins can also be used if desired. A crosslinking agent such as polyisocyanate can be used in addition to or instead of a thermosetting resin to form a heat resistant adhesive composition.

Where fillers are included as an ingredient of the composition, they may be added to the transpolydiolefine on a two roller mill or Banbury internal mixer. The adhesive composition may include, in addition to the above indicated components, such commonly used ingredients as tackifiers, plasticizers, and additives such as antioxidants, or fire retardants. It is preferred that the nonvolatile additives be used in limited amounts, preferably less than 100 parts by weight per 100 parts of the crystalline polymer although amounts up to about 500 parts can be used with some sacrifice in the adhesive strength. It is believed that the additives and in particular the compatible resins retard the rate of crystallization as well as lower the crystallinity of the polymer.

The adhesives of the invention can be used in a variety of applications. In the form of a cement in a volatile solvent, they are used to bond flexible materials such as cloth, leather, rubber and to produce flexible laminates having good peel strength. In the form of a so-called hot-melt adhesive they are used in sealing packages, labelling, book-binding and assembly of footwear. The hot-melt adhesives of this invention are characterized by a setting time which can be adjusted as desired, by compounding, from a short, almost instantaneous, to a long one requiring several hours to develop ultimate strength. Laminae coated with the hot-melt having a long setting time may be assembled to a strongly bonded laminate product with a delay of up to 5 hours during which time the adhesive coat remains pressure sensitive. The adhesive compositions of this invention can also be used in the form of a self-supporting tape for bonding flaps in shipping containers or a finish cover to a counter. The tape is inserted between two surfaces and then heat and pressure are applied to effect the adhesive contact. The adhesive composition can also be used in the form of a "one-way" cement in which case it is applied to one surface only, heat activated to provide tackiness, and then the two surfaces contacted.

The following examples further illustrate the advantages of embodiments of this invention:

EXAMPLE I

An adhesive cement was prepared from a trans-1,4 polyisoprene having the following properties: a trans-1,4 content of 95% as determined by means of an infra-red spectrophotometer, crystallinity of 27 percent at 20° C., melting at 64° C. and Mooney viscosity (ML–4′ at 100° C.) of 14. 50 gms. of the polymer was dissolved in 308 grams of toluene to give a clear solution. The solution containing 14% polymer showed a viscosity of 2200 centipoises, when measured at 25° C. with a Brookfield viscometer Model LVF using spindle #3 at a speed of 12 r.p.m.

The above solution was applied by brush to two strips of No. 8 cotton duck about 5 cm. wide and 20 cm. long.

The first two coats were brushed on the strips and then dried for 30 minutes. A third coat was applied and dried for one hour. The coated strips were then heated for 90 seconds by infra-red lamp to activate the adhesive coating, pressed face to face for 10 seconds at a pressure of 14 kg./cm.$^2$ and allowed to rest for 48 hours at room temperature.

The adhesive strength of the bond was next determined by a "T-peel" test wherein the laminate was manually peeled to expose 2.5 cm. of the strips. The exposed strip ends were then placed in jaws of a tensile test instrument and pulled apart at a rate of 15 cm. per minute. The force required to peel off the strips is called the T-peel strength and was 3.4 kilograms per centimeter of width.

EXAMPLE II

A second sample of adhesive cement was prepared as in Example I except that the polymer was first milled at 70° C. for 20 minutes to reduce its Mooney viscosity to 12. The 14% solution in toluene has a viscosity of 1560 centipoises at 25° C. When applied to strips of No. 8 cotton duck and tested as in Example I it showed a T-peel strength of 5 kg./cm.

A cement having a viscosity of about 15,000 centipoises at 25° C. was obtained by dissolving 14 grams of the same trans-1,4 polyisoprene in 86 grams of methylene chloride. A cement of similar viscosity was also prepared by dissolving 18 gms. of the same polymer in 82 gms. of toluene. A cement having a viscosity of about 1000 centipoises was obtained using a 14% solution in a mixture of 55 parts toluene and 45 parts of n-hexane by weight. Examples I and II show that adhesive cements having attractive properties are obtained even in the absence of tackifiers and reinforcing agents. They are easily prepared and their viscosity is readily adjusted to a desired level as required in a specific application. The adhesive coats on cotton duck were flexible and dry to touch at room temperature.

EXAMPLE III

Two adhesive cements were prepared according to the procedure of Example I from two trans-1,4 polyisoprene samples having a Mooney viscosity (ML-4' at 100° C.) of a 24 and 14, respectively. The two cements contained 10% polymer and were quite fluid. When applied to No. 8 cotton duck as in Example I and tested for the T-peel strength, the first based on the 24 Mooney polymer showed a strength of 1 kg./cm. of width, while the other showed a strength of 3 kg./cm.

EXAMPLE IV

The effect of four types of resins on the adhesive properties of trans-1,4 polyisoprene cement was investigated. To different portions of the solution prepared in Example I were added varying amounts of resin. The resulting cements were applied to No. 8 cotton duck strips and the T-peel strength determined. The results are shown in Table I where the amounts of resin are expressed in parts by weight per 100 parts of trans-1,4 polyisoprene.

TABLE I

| Composition No. | Type of resin | Amount of resin (parts per 100 pts. trans 1,4 polymer) | T-peel strength (kg./cm.) |
|---|---|---|---|
| 1 | Natural wood rosin (a) | 25 | 4.0 |
| 2 | do | 50 | 3.5 |
| 3 | Glycerol rosin ester (b) | 50 | 4.3 |
| 4 | Coumarone-indene resin (c) | 25 | 4.8 |
| 5 | Terpene-phenolic resin (d) | 25 | 5.0 |
| 6 | do | 50 | 4.0 |
| 7 | do | 100 | 2.5 |
| 8 | do | 150 | 1.4 |

"(a) purified Grade K rosin.
(b) rosin ester having an acid number of 7.
(c) melts at 94–107° C.
(d) melts at 150° C."

The T-peel strength of the above compositions was limited by the cohesive strength. The results show that the above resins have a beneficial effect.

EXAMPLE V

Five adhesive cements were prepared using the polyisoprene of Example I into which had been incorporated various fillers by milling for 15 minutes on a laboratory mill at 70° C. Cement No. 6 was prepared by dispersing the filler in toluene and then adding the dispersion to the cement. The compositions of the cements and the T-peel strength of the adhesive bond between two strips of No. 8 cotton duck, measured according to the procedure of Example 1, are shown in Table II.

TABLE II

| | | Composition (parts by weight) | | | | T-peel strength (kg./cm.) |
|---|---|---|---|---|---|---|
| | Filler type | Filler | Polymer | Resin (d) | Toluene | |
| Cement No.: | | | | | | |
| 1 | Hydrated silica (e) | 2.6 | 13.4 | 4.0 | 84 | 4.6 |
| 2 | Easy processing channel black | 2.6 | 13.4 | 4.0 | 84 | 5.0 |
| 3 | Hydrated aluminum silicate (g) | 2.6 | 13.4 | 4.0 | 84 | 4.5 |
| 4 | do | 7.0 | 14.0 | 4.2 | 79 | 4.8 |
| 5 | do | 12.0 | 12.0 | 3.6 | 76 | 3.6 |
| 6 | do | 18.0 | 9.0 | 2.7 | 73 | 1.6 |

"(d) terpene-phenolic resin having a melting point of 150° C.
(e) average particle size 22 millimicron.
(g) 99% will pass a 300 mesh screen."

The above table shows that the adhesion of cement compositions containing up to 100 parts of finely subdivided filler, as in Cement No. 5, per 100 parts of trans-1,4 polyisoprene and 30 parts of the terpene-phenolic resin is good. At a filler loading of 200 parts, the cohesion was stronger than the adhesion and the failure was of an adhesive nature.

EXAMPLE VI

This example illustrates the use of a trans polydiolefine in a heat-resistant adhesive composition. The trans-1,4 polyisoprene described in Example I was dissolved in toluene to produce 10% solution by weight. To two portions of this solution were added 5 and 10 parts by weight, respectively, of a 20% solution in methylene chloride of triphenyl methane trisocyanate. The mixture had a "pot-life" of about one day. Each mixture was applied to a pair of No. 8 cotton duck strips as described in Example I. The coated strips were heat activated, contacted near their ends to form a 1.3 cm. long overlap and then pressed at 14 kg./cm.$^2$ for about 10 seconds to produce a bond. The bonded area was 3.2 square centimeters. The assembly was allowed to rest at room temperature for 48 hours and then tested for shear strength at 66 and 93.5° C. In the test, the free ends of the respective strips were clamped in a tensile tester and pulled at a jaw separation rate of 50 centimeters per minute. The results are presented in Table III.

TABLE III

| Adhesive composition | Shear strength, (kg./cm.²) | |
|---|---|---|
| | At 66° C. | At 93.5° C. |
| Trans polyisoprene (control) | 3 | 1 |
| 100 parts trans polyisoprene solution plus 5 parts triisocyanate solution | 14 | 7 |
| 100 parts polyisoprene solution plus 10 parts triisocyanate solution | 16 | 9 |

The table indicates that the addition of a polyisocyanate increases the shear strength at temperatures above the melting point of the polymer.

EXAMPLE VII

A series of hot-melt adhesive compositions were prepared using the trans-1,4 polyisoprene of Example I, in the formulations given in Table IV. The resin was melted, antioxidant added, and then the trans-1,4 polyisoprene gradually stirred into the molten resin. The resulting hot-melt adhesive was applied in about 0.4 mm. thickness to one strip of fir plywood measuring 2.5 x 15 x 0.6 cm. A second uncoated strip of plywood was then contacted with the first strip so that the ends of the strips overlapped for a distance of 1.3 cm. The strips were manually pressed together and allowed to cool to room temperature. After 48 hours, the shear strength was tested on a tensile tester with the jaws pulling at the rate of 50 cm. per minute. The results are shown in Table IV. The same adhesive compositions were applied also to No. 8 cotton duck, and allowed to set for 48 hours, after which they were manually flexed. The observations on flexibility are also shown in Table IV.

The data show that as the proportion of trans-1,4 polyisoprene is increased the adhesive composition becomes more flexible and shows a maximum shear strength at about 30% level. They also show that the flexibility and strength varies with the type of resin and is affected by the presence of a plasticizer.

The ability of the hot-melt formulation to remain pressure-sensitive was tested on Formulations G and H. For that purpose, a series of four strips of 32 ounce cotton duck of 1" width was coated with each of the above hot-melt formulations. The coated strips were held at room temperature for a time period varying from 0 to 5 hours and then contacted with polished carbon-steel panels and pressed by a hand roller to establish an effective bond at an overlap of 1.3 centimeter. The laminate of cotton duck and carbon steel was next rested for 48 hours at room temperature and tested for shear strength. The results are listed in Table V.

TABLE IV

| Type of ingredient | Adhesive formulation (parts by weight) | | | | | | | |
|---|---|---|---|---|---|---|---|---|
| | A | B | C | D | E | F | G | H |
| Trans-1,4-polyisoprene | 20 | 30 | 50 | 30 | 25 | 30 | 25 | 30 |
| Di-tertiary butyl p-cresol | 2 | 2 | 2 | 2 | 2 | 2 | 2 | 2 |
| Glycerol rosin ester | 80 | 70 | 50 | | | | | |
| Terpene resin, low mol. weight | | | | | 70 | | | |
| Terpene resin, high mol. weight | | | | 60 | | 70 | 35 | |
| Glycerol ester of hydrogenated rosin | | | | | | | | 70 |
| Coumarone-indene resin | | | | 10 | | | 35 | |
| Coumarone dimer oil | | | | 5 | | | 5 | |
| Properties: | | | | | | | | |
| Shear strength, (kg./cm.²) | 22.2 | 40.5 | 34.5 | 15.8 | 30.8 | 40.8 | 37.0 | 38 |
| Flexibility of adhesive film | (¹) | (²) | (³) | (²) | (²) | (⁴) | (²) | (²) |

¹ Stiff.  ² Flexible.  ³ Very flexible.  ⁴ Barely flexible.

TABLE V

| Time elapsed between coating and assembling | Shear strength (kg./cm.²) | |
|---|---|---|
| | Formulation H | Formulation G |
| 0 | 27.1 | 19.0 |
| 1 hour | 26.0 | 16.9 |
| 3 hours | 22.5 | 16.9 |
| 5 hours | 6.3 | 14.1 |

The data of Table V shows that Formulation H had set in 5 hours and lost the ability to effectively bond cotton duck to steel. Formulation G retained the ability to bond even after setting for 5 hours. The long setting times permit a delayed assembly of laminae treated with such hot-melt adhesives of this invention.

EXAMPLE VIII

The hot-melt adhesive Formulation H of Table IV was also used to bond polystyrene foam to steel, each of polyurethane foam and foam rubber to wood, and aluminum foil to paper. In each case, an adhesive bond was established.

EXAMPLE IX

Six self-supporting adhesive tape compositions were prepared using the transpolyisoprene of Example I. The ingredients shown in Table IV were intimately mixed on a mill at 71° C. Each composition was then calendered at 65.5° C. to form a film of about 0.25 mm. thickness. A portion of film was placed between a countertop composition ¹ panel and a fir plywood panel, both panels being 12.5 cm. long and 2.5 cm. wide and overlapping by 1.3 cm. These panels were then bonded by applying a pressure of 14 kg./cm.² for one minute at a temperature of 93° C. After a period of 48 hours at room temperature the bond was tested for shear strength using a tensile tester at a jaw separation rate of 10 cm. per minute. The compositions and the test data are shown in Table VI.

---

¹ Available under the trademark of Arborite.

TABLE VI

| Composition No. | Parts by weight | | | | | | |
|---|---|---|---|---|---|---|---|
| | 1 | 2 | 3 | 4 | 5 | 6 | 7 |
| Trans-1,4 polyisoprene | 100 | 100 | 100 | 100 | 100 | 100 | 100 |
| 2,2-methylene bis (4-methyl 6-tert. butyl phenol) | 2 | 2 | 2 | 2 | 2 | 2 | 2 |
| Hydrated silica | | | 20 | | | | 30 |
| Hydrated aluminum silicate (dixie clay) | | | | | | 50 | |
| Easy processing channel carbon black | | | | | 20 | | |
| Terpene-phenolic resin (M.P. 150° C.) | | 30 | 30 | 30 | | | 100 |
| Coumarone-indene resin (M.P. 94–107° C.) | | | | | 30 | | |
| Glycerol rosin ester | | | | | | 30 | |
| Shear strength (kg./cm.²) | 17.6 | 22.5 | 26.7 | 31.7 | 17.6 | 14.1 | 30 |

The above table shows that the self-supporting adhesive tapes or films based on trans-1,4 polyisoprene are capable of strongly bonding wood and cellulose-based laminae. Compatible resins and reinforcing fillers increase the shear strength of the adhesive bond.

We claim:

1. A method of bonding which comprises interposing between two surfaces a non-aqueous adhesive composition comprising as the sole macromolecular material a crystalline synthetic trans-1,4 polymer of isoprene, said polymer having a molecular weight of about 50,000 to 350,000 and at least 85% of the isoprene monomer units in the trans-1,4 configuration and being at least 10% crystalline and pressing the surfaces together, whereby an adhesive bond is established, said adhesive being in the form of a self-supporting tape, and said tape being adhesively activated by heating at a temperature above the melting point of said polymer, and cooling said surfaces at ambient temperature.

2. The method of bonding according to claim 1 in which the adhesive composition also contains between 30 and 100 parts of a compatible thermoplastic resin selected from the group consisting of non-heat-reactive phenolic resins, terpene-phenolic resins, coumarone-indene resins and abietic acid-based resins and between 20 and 50 parts of a filler, said parts being parts by weight per 100 parts of trans-1,4 polymer.

3. A self-supporting adhesive tape made of an adhesive composition comprising a mixture of a crystalline synthetic trans-1,4 polymer of isoprene having at least 85% of the isoprene monomer units in the trans-1,4 conguration and a molecular weight of about 50,000 to 350,000 as the solemacromolecular material and a compatible thermoplastic resin selected from the group consisting of non-heat-reactive phenolic resins, terpene-phenolic resins, coumarone-indene resins and abietic acid-based resins.

4. The self-supporting adhesive tape according to claim 3 in which said compatible resin is present in an amount between 30 and 100 parts by weight per 100 parts of trans-1,4 polymer.

References Cited

UNITED STATES PATENTS

| 3,054,754 | 9/1962 | Lasky | 260—94.3X |
| 2,878,142 | 3/1959 | Bohaty | 260—845 |
| 2,900,292 | 8/1959 | Coleman et al. | 260—845 |
| 2,947,710 | 8/1960 | Frantz | 260—845 |
| 3,027,337 | 3/1962 | Tritsch | 260—33.6 |
| 3,238,156 | 3/1966 | Kohrn | 260—2.5 |
| 3,275,614 | 9/1966 | Pampys et al. | 260—845 |
| 3,287,301 | 11/1966 | Fysh et al. | 260—94.7 |
| 3,296,227 | 11/1967 | Burleigh et al. | 260—94.3 |
| 3,332,903 | 7/1967 | Kavalir | 260—33.6 |
| 3,326,824 | 6/1967 | Graham | 260—5 |
| 3,337,520 | 8/1967 | Bjornson et al. | 260—94.3 |
| 3,350,342 | 10/1967 | Begley | 260—41.5X |

OTHER REFERENCES

Barron, Harry, "Modern Rubber Chemistry," New York, Van Rostrand Company Inc. 1948, p. 27.

Davis, C. C. and Blake, J. T., "The Chemistry and Technology of Rubber," New York, Reinhold Publishing Corp., 1937, p. 711.

Skeist, I., "Handbook of Adhesives," Reinhold, New York, 1962, TP 968S5 (pp. 344 to 348 relied on).

Railsback, J. R., et al., "Properties of High-trans Polybutadiene," 1960 (pp. 1 to 11 relied on).

Rose, A., et al., "The condensed Chemical Dictionary," Reinhold, New York, 1956, OD5C5 (p. 325 relied on).

JOHN T. GOOLKASIAN, Primary Examiner

D. J. FRITSCH, Assistant Examiner

U.S. Cl. X.R.

156—307, 308, 334; 161—190, 203, 217, 249, 250, 253, 255; 260—94.2, 829, 845